United States Patent [19]

McCrery, Jr. et al.

[11] 4,440,078

[45] Apr. 3, 1984

[54] ADJUSTABLE ELECTRICALLY CONTROLLED LIVESTOCK MARKING APPARATUS

[76] Inventors: David N. McCrery, Jr., R.R. 1, Monmouth, Ill. 61462; Harry J. Hoerner, P.O. Box 16, Good Hope, Ill. 61438; John W. Purlee, R.R. 1, Monmouth, Ill. 61462

[21] Appl. No.: 328,794

[22] Filed: Dec. 8, 1981

[51] Int. Cl.$^3$ .......................... B31F 1/07; B44B 5/00
[52] U.S. Cl. ........................................ 101/4; 101/26; 101/44; 119/159; 128/316; 81/9.22
[58] Field of Search ...................... 101/35, 41, 42, 43, 101/44, 30, 36, 4, 11, 98, 26, 19, 20, 37, 333, 335, 298; 81/9.22; 40/300; 119/159; 400/388, 388.1, 143

[56] References Cited

U.S. PATENT DOCUMENTS

| | | | |
|---|---|---|---|
| 155,879 | 10/1874 | McDonald | 101/126 |
| 1,369,934 | 3/1921 | Onstad | 101/11 X |
| 1,935,671 | 11/1933 | Schmitt | 101/35 |
| 2,127,514 | 8/1938 | Hausman | 400/143 |
| 2,316,932 | 4/1943 | Bruce | 119/159 |
| 2,654,312 | 10/1953 | Phipps | 101/43 X |
| 3,163,106 | 12/1964 | Failor | 101/37 X |
| 3,173,402 | 3/1965 | Cassel | 119/159 |

FOREIGN PATENT DOCUMENTS

| | | | |
|---|---|---|---|
| 69767 | 9/1915 | Austria | 400/143 |
| 2309331 | of 1973 | Fed. Rep. of Germany | 81/9.22 |

*Primary Examiner*—Edgar S. Burr
*Assistant Examiner*—Charles A. Pearson
*Attorney, Agent, or Firm*—Berman, Aisenberg & Platt

[57] ABSTRACT

Apparatus for marking livestock and other articles includes a pivoted support structure for a marking head. The support structure contacts the animal and adjusts the marking head position appropriately for marking the animal. An electrical switch detects the presence of the livestock within the support structure, formed as a hood for contacting the animal to be marked, and activates a number of solenoids, in a predetermined sequence, for marking the animal. The marking control circuitry includes solenoids for inking the marking head and for reinking the inking pad. A control is provided for adjusting the number of times an animal is to be marked in a pass through the apparatus.

9 Claims, 5 Drawing Figures

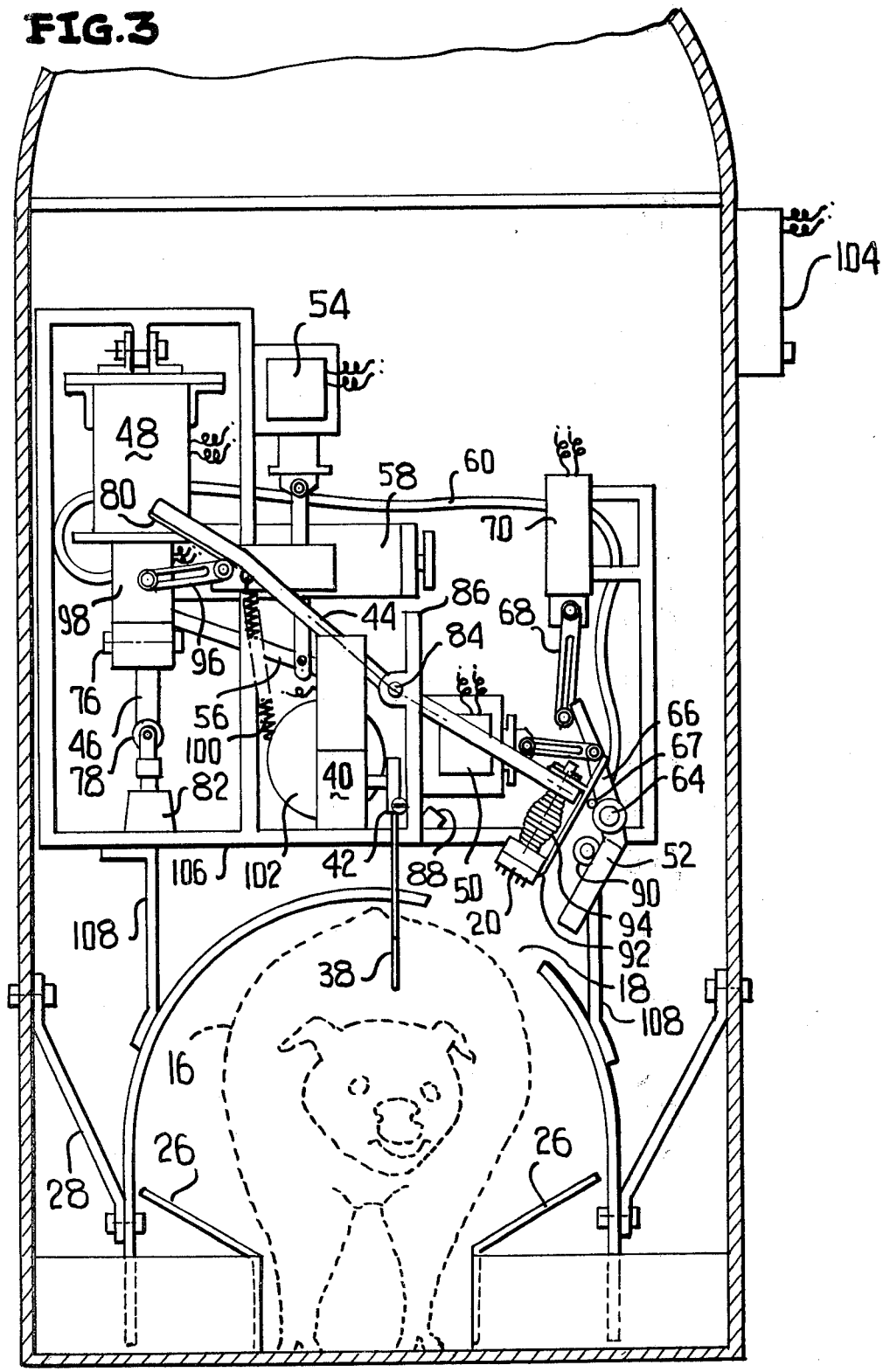

ADJUSTABLE ELECTRICALLY CONTROLLED LIVESTOCK MARKING APPARATUS

BACKGROUND OF THE INVENTION

This invention relates to marking devices, and more particularly to automatically operated, electrically controlled devices for marking livestock and other articles having differing dimensions.

Prior art marking of livestock and other articles is known. Holt U.S. Pat. No. 2,126,777 and Ker U.S. Pat. No. 1,851,672 disclose devices for tattooing animals at various anatomical locations. Both patents disclose manually operated tattooing tools for interchangeable tattoo or type-blocks.

McKee et al U.S. Pat. No. 1,807,631 discloses an apparatus for branding articles such as sides of bacon. The articles to be branded pass through the device, between vertical rollers 25 and a presser roller 26, and frictionally engage a branding wheel, or marking roller, 6. The branding wheel is consequently rotated, and its needles 11 are inked by an ink brush 10 prior to marking the article.

None of these devices, however, automatically adjust for different sizes of articles to be marked so that the marking head contacts such articles uniformly. Nor do the prior art devices include automatic means for sensing the presence of livestock, or other articles, in the marking area, thus to operate control devices for activating the marking head.

Thus, the prior art does not provide structures for automatically adjusting the position of a marking head to mark livestock of varying sizes, and requires manual operation of the marking device in order to brand, tattoo, or otherwise mark an article. No devices are disclosed for guiding livestock or other articles to a marking area, adjusting the marking head for the size of the article to be marked, sensing the presence of the article at the marking station, and appropriately marking or tattooing the article.

SUMMARY AND OBJECTS OF THE INVENTION

It is accordingly a primary object of the present invention to overcome the difficulties of the prior art and to provide an automatic tattooing apparatus for livestock.

It is a more specific object of the invention to provide structure for marking livestock or other articles, by tattooing, branding, or the like, in which the marking head is appropriately positioned to mark articles having differing sizes.

It is another object of the invention to provide a marking apparatus in which the presence of the article to be marked at the marking station is automatically accomplished, and in which the marking sequence is thus automatically started.

It is a further object of the invention to provide a marking apparatus in which a marking head, using marking fluid such as ink, is automatically reinked for each marking sequence.

It is still another object of the invention to provide a marking apparatus including electrical control circuitry, in which a number of sequential operations are automatically carried out in response to a sensing of the presence of the article to be marked at a marking station, and in which a number of switching elements control a plurality of electromechanical devices for carrying out the various sequences.

It is yet another object of the invention to provide a marking apparatus including a device for providing a variable number of markings to be made on an article in its passage through the apparatus.

In accordance with these and other objects of the invention, an embodiment thereof is provided in which a hood is mounted by means of pivoted, counterbalanced linkages, the hood providing support for a marking head. Livestock are guided to the marking station by a channeling chute, and the counterbalanced hood easily mounts the animals and positions the marking head appropriately for the size of the particular animal to be marked.

A switch is provided, with an actuating lever positioned for sensing the presence of the livestock and hood at the marking station. Closure of the switch activates a pair of solenoids for removing an inking pad from the tattooing needles of the marking head, and for pumping additional ink to the pad from an ink reservoir. Completion of the desired movement by the solenoids is detected by a second switch, which in turn activates another solenoid, for moving the marking head to contact the animal to be marked. A third switch senses completion of movement of this other solenoid and deenergizes the same, thereby to stop the marking sequence.

A variable delay element is further provided in the circuit, responsive to the third switch, for removing any further excitation from the other solenoid, although the actuating lever may still sense the presence of the animal at the marking station. The delay provided by the variable delay element may be adjusted to assure that the animal is marked just once in its passage through the marking station. Alternatively, by increasing the delay of the variable delay element, so that excitation for the other solenoid is removed somewhat later, any number N, where N=0, 1, 2 . . . , of additional marks may be provided on the livestock prior to leaving the marking station. The invention thus advantageously assures that at least one clear imprint of the mark is inked on the livestock by providing an adjustable number of imprints.

BRIEF DESCRIPTION OF THE DRAWING

The foregoing and other objects, features and advantages of the invention will become more readily apparent upon reference to the following detailed description of the preferred embodiment, when taken in conjunction with the accompanying drawing in which like numerals refer to like parts. In the drawing.

FIG. 3 shows a front view of the inventive structure, and includes details of the marking structure used therewith;

DETAILED DESCRIPTION OF THE PREFERRED EMBODIMENT

Figure 1:
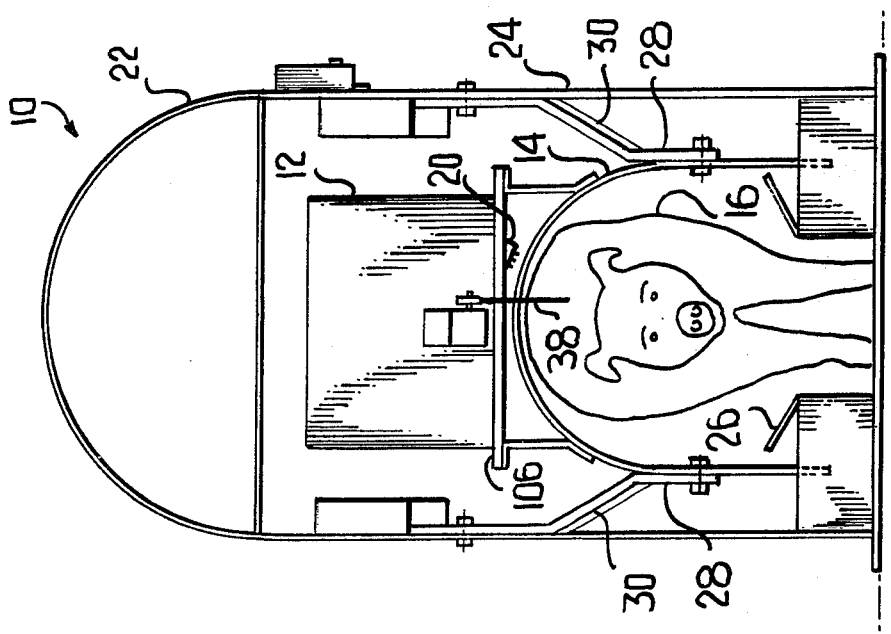
FIG. 1 shows a front view of a structure according to the invention, in which a hog is ready for marking.

Referring now to FIG. 1, an apparatus for marking articles in accordance with the invention is generally shown at 10. As has been previously described, the inventive structure may be used for marking by tattooing, branding by heat or marking fluid, or by any other method known in the art. The inventive apparatus may be used to mark livestock, animal carcasses, foodstuffs, or other articles.

The preferred embodiment illustratively shows the use of the invention for tattooing livestock, such as hogs.

Figure 2:
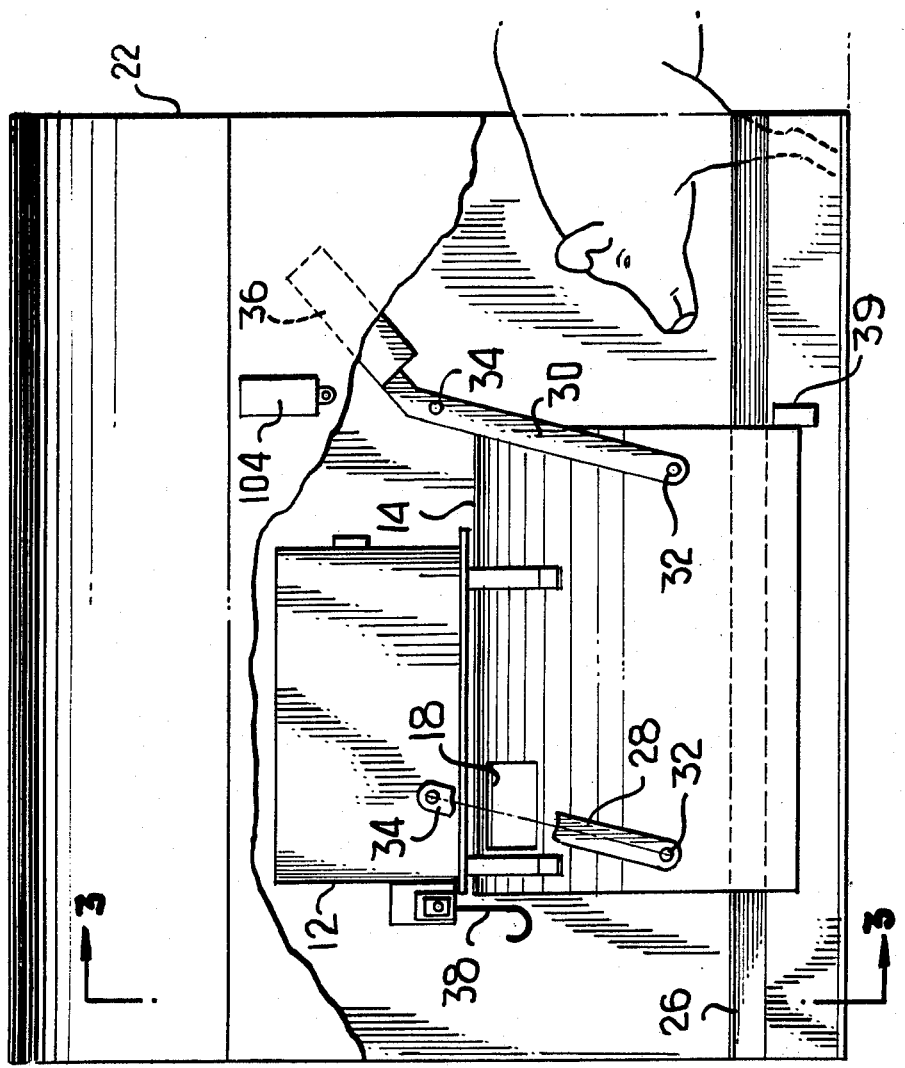
FIG. 2 shows a side view of the structure of FIG. 1.

As shown in FIGS. 1-2, the apparatus includes an operating unit 12 for applying the marking to the articles. Operating unit 12 is shown to be mounted on a hood 14, generally shaped for receiving the articles ready for marking. For the specific embodiment in which hogs are to be tattooed, the hood 14 is generally shaped to fit the typical dimensions of a hog 16. Hood 14 thus receives the hog and is in substantial contact therewith over a portion of the hood's curvilinear surface. An opening 18 is provided in hood 14, for passage of a marking head 20 therethrough to mark the article. Thus, when the hog arrives at the marking station, head 20, carrying a plurality of tattooing needles, is moved through opening 18 to impact upon and tattoo the hog with the desired marking.

The apparatus is mounted within a support structure including a canopy 22 and frame 24. A chute, or guide-path, is provided to direct the hogs to the marking station. The chute includes guides 26, for example.

Hood 14 is floatingly mounted to the support structure by a plurality of parallel links, pivoted at their ends to permit the hood to ride forwardly and upwardly upon contacting the hog. Specifically, a pair of forward links 28 is provided, along with a further pair of rearward links 30. The links are pivoted at the hood, as shown at points 32, and at the frame, as shown at points 34. In order to reduce any disruptive effect on the movement of the articles to be marked, and specifically to reduce the burden on the hogs entering the hooded receiving area, rearward links 30 are provided with counterbalances 36.

In operation, hogs 16 pass through the chute, guided by guides 26, in single file. The hood 14 contacts the back of hog 16 and rides forwardly and upwardly, on the hog's back. The present linkage provides automatic adjustment of the hood position, and hence of the marking head position, in accordance with the height of any particular hog. It is appreciated, of course, that other receptacles may be used for the articles to be marked, appropriately located for marking any desired portion thereof. Thus, instead of a gravitationally suspended and counterbalanced hood, horizontally displaceable receiving devices may be used to conform to varying horizontal dimensions of the articles to be marked. The present apparatus is provided with hood 14, opening 18 therein, and marking head 20 appropriately disposed for marking hogs just left of center on their backs.

With hood 14 floatingly supported on its back, the hog proceeds through the apparatus until arrival at the marking station. A lever 38 detects the hog's presence at the marking station, trips an associated switch, and sets in motion the marking process. Having been tattooed, the hog proceeds forwardly through the apparatus, until hood 14 falls from its back, coming to rest against stops 39 until passage of the next animal for marking.

Figure 4:
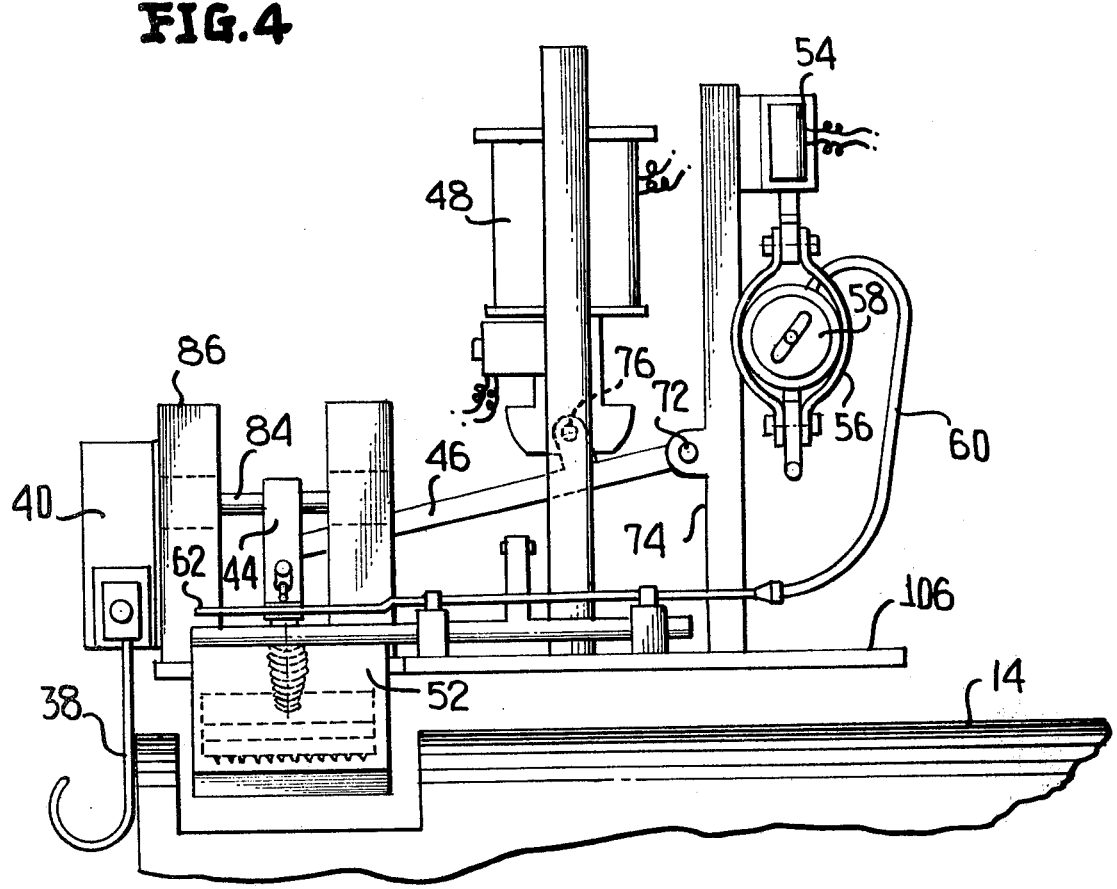
FIG. 4 shows a side view of the marking head shown in FIG. 3.

Referring now to FIGS. 3-4, the mechanical structure of the inventive apparatus is shown in greater details. Lever 38 is adjustably connected to a switching device 40 by a set screw adjusting apparatus 42. Tattooing head 20 is mounted on an arm 44 which is moved by driving arm 46 of a main solenoid 48. If desired, the mounting of the head 20 may be of a quick disconnect type, such as a pin extending through the upper end of a shaft which carries the marking head 20 at its lower end. Prior to energization of main solenoid 48, and application of marking head 20 to the hog, a re-inking operation is carried out.

In response to activation of switching device 40, a second solenoid 50 is energized for mechanically pulling an ink pad 52 away from tattooing head 20, as shown in FIG. 3. Simultaneously, a third solenoid 54 is energized, driving a pump mechanism 56 for pumping a measured quantity of ink from an ink reservoir 58 via a pressure hose 60. The ink is pumped to a metal application tube 62 and thence to ink pad 52. In the rest position of the inventive apparatus, ink pad 52 is in contact with tattoo head 20, as seen in FIG. 4.

Upon full extension of second solenoid 50 to the position shown in FIG. 3, ink pad 52, connected at a pivot point 64 to a driving member 66, contacts a trip lever 68 of a second switch device 70 for providing electrical current to main solenoid 48, energizing the same and causing movement of tattooing head 20 to mark the animal. As hereinabove described, solenoid 48, connected to main driving arm 46, causes movement of arm 44 and thus of head 20. As seen in FIG. 4, main driving arm 46 is pivoted at 72 to a shaft 74. Arm 46 is further pivoted at 76 to solenoid 48, so that upon retraction of the solenoid, arm 46 is raised.

A small roller wheel 78, mounted at the end of arm 46, is moved upwardly by movement of arm 46, and abuts against a steel plate 80 on the driven end of arm 44. In FIG. 3, main tattooing arm 44 is shown in the middle of a power stroke, while main driving arm 46 is shown in its rest position, with roller wheel 78 not drivingly engaging steel plate 80, for clarity of illustration. Driving arm 46 is seen to be at rest and supported by a rubber bumper 82. As seen most clearly from FIG. 3, tattooing arm 44 is pivoted on a shaft 84 mounted on a support member 86. Activation of main solenoid 48 thus causes head 20 to pass through opening 18 in hood 14 and to contact the back of hog 16. In order to permit cycling the apparatus without the presence of a hog at the marking station, a stop 88, formed of a rubber bumper, is provided.

A steel wheel 90, shown in FIG. 3, is fastened to ink pad 52, and a metal guide 92 is fastened to the end of tattooing arm 44. The wheel 90 and guide 92 are provided as a safety device, for keeping ink pad 52 away from the tattooing arm 44 in the event of non-sequential cycling of the electrical control system. Guide 92 further acts to prevent marking head 20, with its tattooing needles, which is mounted to arm 44 on a flexible spring 94, from swinging outwardly during a cycle.

In operation, when main driving arm 46 of solenoid 48 reaches full extension, its position is detected by a lever 96, activating a third switching device 98 for de-energizing main solenoid 48, returning the same to its expanded, rest position. Tattooing arm 44 is thus permitted to rotate to its rest position, with head 20 raised from the tattooed animal, under the influence of a retracting spring 100, wound about a pulley 102. Pulley 102 is used to provide minimal tension for the spring 100 at rest, and increased tension at its full stroke position. This arrangement provides for a quick return of arm 44, while offering minimal resistance at the beginning of a power stroke of main driving arm 46.

When switching device 98 is tripped and de-energizes main solenoid 48, a second set of contacts thereon provide for simultaneously routing current to a time delay device, such as pneumatic time-delay relay switching device 104.

Time delay relay 104 is used to adjust the number of cycles through which the apparatus will function in response to a single activation of sensing lever 38. Any delay device may be used for disrupting the electrical path associated with second switch device 70. Thus, by providing a longer delay prior to disrupting operation of switch device 70, a greater number of additional cycles of the apparatus is provided. A shorter delay, or no delay at all, results in no additional cycles, so that only a single mark is provided for the hog. Preferably, the delay device is adjusted to permit a total of approximately two tattoos per hog, thus increasing the percentage of readable tattoos.

As seen in the figures, the operating unit is mounted on a frame 106 mounted to hood 14 by brackets 108. It is to be understood that, although all components of the operating unit 12 are shown to be mounted on frame 106, it is only necessary that the marking head 20 be mounted thereon, to enable appropriate marking of livestock independent of animal size. Various components of the operating unit may be mounted on the main frame 24 in order to lighten the load on links 28 and 30.

Figure 5:
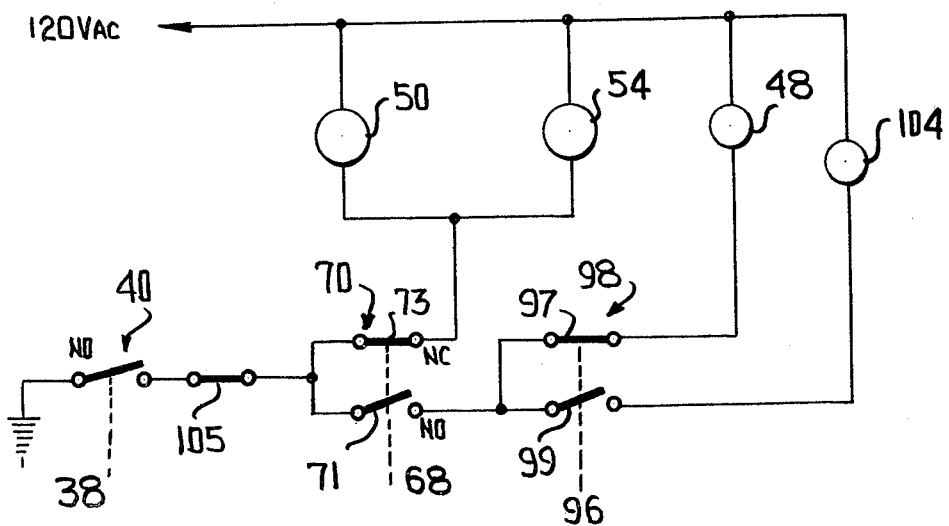
FIG. 5 shows an electrical circuit used to control the structure of FIGS. 1, 2, 3 and 4.

Referring now to FIG. 5, the electrical control circuit used in the apparatus is seen schematically to include first switching device 40, having a pair of normally open contacts, in series with second switch device 70, having normally open contacts 71 and normally closed contacts 73. Normally closed contacts 73 provide power to solenoids 50 and 54 upon closure of switching device 40 to provide operation as described above. Activation of trip lever 68 opens contacts 73 and closes contacts 71, thereby providing power to main solenoid 48 through switch 98. Switch 98 includes normally closed contacts 97 and normally open contacts 99. Activation of lever 96 opens contacts 97 and closes contacts 99, thereby activating a time-delay relay 104, which will cause opening of contacts 105 after a predetermined delay.

It is understood that, while mechanical switches are shown in FIG. 5 for carrying out the functions hereinabove described, such switching functions may equally well be carried out by transistorized devices, using solid state switches, for example, or by vacuum-tube technology, or the like. Further, the switching functions of the apparatus may be similarly conducted by programmed logic devices, such as logic gates or programmed computing circuits.

The preceeding specification describes the preferred embodiment of the invention as an illustration and not a limitation thereof. It is appreciated that equivalent variations and modifications of the invention will occur to those skilled in the art. Such modifications, variations and equivalents are within the scope of the invention as recited with greater particularity in the appended claims, when interpreted to obtain the benefits of all equivalents to which the invention is fairly and legally entitled.

We claim:

1. Apparatus for marking articles comprising:
    a first arm pivotally mounted for rotation about a first axis and having a marking means thereon;
    a second arm pivotally mounted for rotation about a second axis for contacting said first arm and causing said first arm to pivot about said first axis;
    first power means for causing rotation of said second arm about said second axis;
    sensing means for detecting the presence of said article and activating said first power means in response to said presence; and
    receiving means for directing one of said articles to a position such that said marking means may contact said article;
    said sensing means comprising
    first switch means responsive to the presence of said article;
    second power means responsive to said first switch means for rotating an ink pad means from a position in contact with said marking means to a position not in contact with said marking means;
    inking means responsive to the position of said ink pad means for supplying ink to said ink pad means when said ink pad means is not in contact with said marking means;
    wherein said first power means is responsive to the position of said ink pad means and is activated when said ink pad means is not in contact with said marking means.

2. An apparatus for marking articles as recited in claim 1 wherein said articles include livestock, and wherein said receiving means comprises:
    (a) hood means for contacting the back of livestock to be marked; and
    (b) linkage means connected to said hood means for positioning said hood means on said livestock moving through said apparatus for marking.

3. An apparatus for marking articles as recited in claim 2 wherein said linkage means includes a plurality of pivoted links connected to said hood means, and a counterweight support connected to at least one of said links for reducing support required to be provided by said livestock for said hood means and for enabling elevation of said hood means with reduced effort by said livestock.

4. An apparatus for marking articles as recited in claim 3 wherein said guide means comprises a chute directing said livestock to said hood means.

5. An apparatus for marking articles as recited in claim 4 wherein said marking means comprises tattooing means for tattooing said livestock.

6. The apparatus of claim 1
    wherein said first power means, said first arm, and said second arm automatically reset after a marking operation, and further comprising time delay switch means comprising a second switch in series with said first switch means which opens after a predetermined time interval for permiting a predetermined number of marking operations for each article.

7. Apparatus for tattooing an animal comprising:
    (a) chute means for confining said animal to a predetermined path,
    (b) hood means supported above said chute, comprising an element having an axis parallel to said path,
    (c) a first arm pivotally mounted to said hood means for rotation about a first axis parallel to said path,
    (d) means for tattooing attached to one end of said first arm,
    (e) ink pad means pivotally mounted to said hood means for contacting said tattooing means when said first arm is in a rest position and for also pivoting away from said tattooing means,
(f) second arm means mounted on said hood means for rotation about a second axis perpendicular to said path and having one end adapted to contact said first arm to thereby rotate said first arm about said first axis,
(g) first power means for pivoting said second arm about said second axis, in response to a first power signal,
(h) second power means for rotating said ink pad means in response to a second signal,
(i) sensing means for sensing the presence of an animal in a predetermined position under said hood means and on said path and for supplying said second signal to said second power means when said animal is in said position,
(j) switch means for sensing a predetermined position of said ink pad means and for supplying said first power signal to said first power means when said ink pad means is in said predetermined position, whereby said animal will be automatically tattooed as it moves along said path.

8. The apparatus of claim 7 further comprising:
(k) automatic inking means for supplying fresh ink to said ink pad means in response to a signal indicating the position of said ink pad means.

9. The apparatus of claim 8 wherein said hood means has an opening to allow said tattooing means to pass through to mark said animal.

* * * * *